Patented Feb. 5, 1946

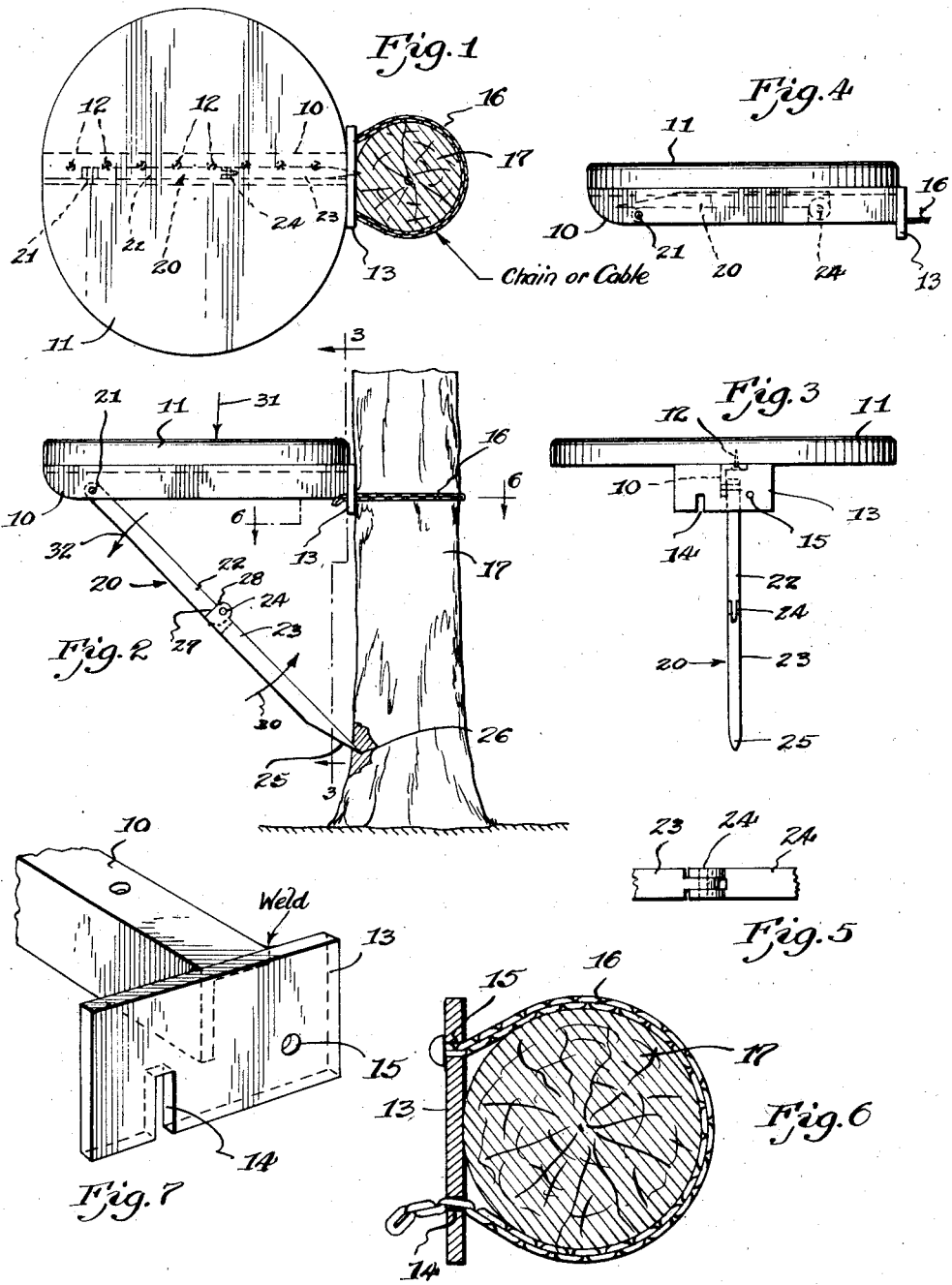

2,394,203

UNITED STATES PATENT OFFICE 2,394,203

PORTABLE SPORTSMAN'S SEAT

Henry V. Pruder, Detroit, Mich., assignor of thirty per cent to Ambrose Mousseau, Detroit, Mich.

Application September 30, 1944, Serial No. 556,512

3 Claims. (Cl. 155—80)

My invention relates to a portable sportsman's seat arranged to be quickly and readily attached to a tree, post or other fixed support, and comprises more particularly, a seat structure with a prong hinged thereto, for engaging the fixed support at a point beneath the level of the seat, after same has been secured to the said fixed support.

It will be understood that portable seats of this character must be such, as may be readily carried, but so constructed as to be firmly attached to a tree, post or other fixed support. Such devices as I have in mind have not been made available heretofore and I therefore offer a structure of particular utility for the purposes intended.

An object of my present invention is to construct a portable sportsman's seat of novel and simplified construction, but providing a seat structure having means whereby same may be readily and quickly anchored to a fixed support, and utilized immediately as a seat, same being so constructed as to permit the attachment of same to a fixed support at any desired suitable height from the ground.

For a more detailed understanding of my invention, reference may be had to the accompanying drawing illustrating a preferred embodiment thereof, in which like parts are referred to by like characters throughout the several views, and in which:

Fig. 1 is a plan view of my improved sportsman's seat,

Fig. 2 is a side view thereof,

Fig. 3 is a rear end view with the flexible chain or cable detached, and as viewed from the sectional line 3—3 of Fig. 2, Fig. 4 is a side elevational view with the prong or leg portion folded up against the seat, Fig. 5 is a fragmentary detail view of the hinge connecting the two portions of the prong or leg, Fig. 6 is a horizontal sectional view taken on the line 6—6 of Fig. 2, and Fig. 7 is a detail perspective view of the seat frame and flange.

My improved seat structure comprises a seat frame 10 constructed of an angle bar, which supports a seat 11, same being secured thereto by screws 12 or other suitable fastening means. A flange 13 is welded or otherwise permanently secured to one end of the angle 10, this flange being provided with a slot 14 opening downwardly through the lower edge thereof, and a hole 15 which is offset laterally from said slot 14. A flexible element 16 such as a chain, cable or other flexible structure, is anchored or permanently secured in the hole 15, this chain being arranged to be looped around the trunk of a tree, a post, or other upright of a fixed support, and the free end of said chain is then hooked into the slot 14. The slot 14 is of such a width as to permit a length of chain to be inserted therein, and the chain is thus locked from being pulled out of said slot.

A prong or leg 20 is hinged, as at 21, to the forward end of said angle 10, and this prong preferably consists of a pair of prong portions 22 and 23 hinged together as at 24, the free end of said prong being preferably pointed as at 25 to stick into the post or support as at 26. The prong portion 22 is provided with a shoulder 27 which abuts the shoulder 28 carried by the other prong portion 23, so that when the prong or leg is extended it provides a single length, said hinged structure permitting said leg or prong to be only folded inwardly toward the underside of the seat structure in a direction as indicated by arrow 30. The hinge 24 is off center, so that when loads are applied on the upper side of the seat, as indicated by arrow 31, it will exert a force on said prong in a direction as indicated by arrow 32 and thus there is no tendency of the hinged prong to collapse or fold up when a person is seated on said seat.

In order to make this structure readily portable, the hinged prong or leg 20 may be folded up against the underside of the seat as shown in Fig. 4. When one desires to use this seat it will be readily apparent that the prong or leg may be swung about the hinge 21 and fastened to a tree or post by clamping the flexible element 16 around same, and engaging the prong into the post or tree as shown in Fig. 2.

It will be apparent to those skilled in the art to which my invention pertains, that various modifications and changes may be made therein without departing from the spirit of my invention or from the scope of the appended claims.

I claim:

1. A portable sportsman's seat comprising a seat structure having a central seat support member, a flexible element attached at one end to said seat structure and constructed to be looped around a post or other fixed support, said free end of said element detachably secured to said seat structure, and a prong member hinged on the underside of said seat structure to said member and adapted to engage the fixed support beneath said seat structure, said seat structure provided with a flange extending normal to the plane of the seat and arranged to lie against the fixed support, said flange secured to one end of said central seat support member, said flexible element permanently connected with said flange to one side of said member and detachably secured thereto to the other side of said member.

2. A portable sportsman's seat comprising a seat structure, a flexible element attached at one end to said seat structure and constructed to be looped around a post or other fixed support, said free end of said element detachably secured to said seat structure, and a prong member hinged to the underside of said seat structure and adapted to engage the fixed support beneath said seat structure, said seat structure provided with a flange extending normal to the plane of the seat and provided with a downwardly opening slot, the free end of said flexible element when looped about said fixed support secured in said slot and secured firmly therein when a load is supported on said seat structure.

3. A portable sportsman's seat comprising a seat structure, a flexible element attached at one end to said seat structure and constructed to be looped around a post or other fixed support, said free end of said element detachably secured to said seat structure, and a prong member hinged to the underside of said seat structure and adapted to engage the fixed support beneath said seat structure, said seat structure provided with a flange extending normal to the plane of the seat and provided with a downwardly opening slot, the free end of said flexible element when looped about said fixed support secured in said slot and secured firmly therein when a load is supported on said seat structure, said flexible element being permanently secured at one end to said flange at a point spaced laterally from said slot.

HENRY V. PRUDER.